(12) United States Patent
Zhang et al.

(10) Patent No.: US 10,856,262 B2
(45) Date of Patent: Dec. 1, 2020

(54) METHODS FOR RECEIVING AND TRANSMITTING SINGLE-CELL MULTICAST SERVICE, USER EQUIPMENT, AND BASE STATION

(71) Applicants: SHARP KABUSHIKI KAISHA, Sakai (JP); FG Innovation Company Limited, Tuen Mun (HK)

(72) Inventors: Chongming Zhang, Shanghai (CN); Renmao Liu, Shanghai (CN)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/337,335

(22) PCT Filed: Aug. 15, 2017

(86) PCT No.: PCT/CN2017/097509
§ 371 (c)(1),
(2) Date: Mar. 27, 2019

(87) PCT Pub. No.: WO2018/059149
PCT Pub. Date: Apr. 5, 2018

(65) Prior Publication Data
US 2020/0037287 A1 Jan. 30, 2020

(30) Foreign Application Priority Data

Sep. 28, 2016 (CN) .......................... 2016 1 0862427

(51) Int. Cl.
*H04W 72/12* (2009.01)
*H04W 72/00* (2009.01)
*H04W 72/04* (2009.01)

(52) U.S. Cl.
CPC ....... *H04W 72/005* (2013.01); *H04W 72/042* (2013.01)

(58) Field of Classification Search
CPC . H04W 72/005; H04W 72/042; H04W 72/12; H04W 24/08; H04W 4/70;
(Continued)

(56) References Cited

U.S. PATENT DOCUMENTS

2018/0049006 A1* 2/2018 Hong ...................... H04L 67/32
2019/0246254 A1* 8/2019 Chatterjee ............. H04L 1/0061

OTHER PUBLICATIONS

Vodafone et al., "New work item proposal: Enhancements of Nb-IoT", RP-161324, 3GPP TSG RAN Meeting #72, Busan, Korea, Jun. 13-16, 2016.
(Continued)

*Primary Examiner* — Phuc H Tran
(74) *Attorney, Agent, or Firm* — ScienBiziP, P.C.

(57) ABSTRACT

The present disclosure provides a method performed at UE, comprising: receiving single-cell multicast control channel (SC-MCCH)-related information; receiving single-cell multicast traffic channel (SC-MTCH)-related information according to the received SC-MCCH-related information; monitoring an SC-MCCH information change notification used for indicating whether SC-MCCH transmission information changes; and when the monitoring of the SC-MCCH information change notification conflicts with the receiving of the SC-MTCH-related information, monitoring the SC-MCCH information change notification. The present disclosure further provides a method performed at a base station, and UE and a base station for respectively performing the foregoing methods.

2 Claims, 4 Drawing Sheets

(58) Field of Classification Search
CPC ............... H04W 4/80; H04W 72/0446; H04W 72/0453; H04W 72/0466; H04W 76/11; H04W 68/005; H04W 4/06; H04W 72/1252; H04W 72/1289; H04W 76/27; H04W 80/02; H04W 80/08; H04W 88/06; H04L 1/0046; H04L 1/0061; H04L 1/0072; H04L 5/001; H04L 5/0053; H04L 5/0091; H04L 1/0031; H04L 1/08; H04L 5/00; H04L 5/0007; H04L 5/0048

See application file for complete search history.

(56) References Cited

OTHER PUBLICATIONS

Qualcomm Incorporated, "New Work Item: NarrowBand IOT (NB-IOT)", RP-151621, 3GPP TSG RAN Meeting #69, Phoenix, USA, Sep. 14-16, 2015.

Huawei, Hisilicon., "Search space and collision handling for multicast in NB-IoT", R1-166199, 3GPP TSG RAN WG1 Meeting #86, Gothenburg, Sweden, Aug. 22-26, 2016.

Huawei et al., "Priority of Multi-Cast in NB-IoT", R2-166321, 3GPP TSG-RAN WG2 Meeting #95bis, Kaohsiung, Oct. 10-14, 2016.

ZTE: "Consideration for multicast support for NB-IoT", 3GPP Draft; R1-167325 Multicast for NB-IOT, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22, 2016-Aug. 26, 2016, Aug. 13, 2016 (Aug. 13, 2016), XP051133024, Retrieved from the Internet: URL:http://www.3gpp.org/ftp/tsg_ran/WG1_RL1/TSGR1_86/Dosc/ [retrieved on Aug. 13, 2016] *subsection 2.2*.

Intel Corporation: "SC-PtM support for NB-IoT", 3GPP Draft; R1-166538 Intel—SC-PTM_ENB-IOT, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22, 2016-Aug. 26, 2016, Aug. 13, 2016 (Aug. 13, 2016), XP051132825, Retrieved from the Internet: URL:http://www.3gpp.org/ftp/tsg_ran/WG1_RL1/TSGR1_86/Dosc/ [retrieved on Aug. 13, 2016] *Section 3*.

\* cited by examiner

METHODS FOR RECEIVING AND TRANSMITTING SINGLE-CELL MULTICAST SERVICE, USER EQUIPMENT, AND BASE STATION

TECHNICAL FIELD

The present invention relates to the field of wireless communications technologies, and specifically, to a method for receiving a single-cell multicast service and user equipment for performing the method, and a method for transmitting a single-cell multicast service and a base station for performing the method.

BACKGROUND

With the rapid growth of mobile communication and great progress of technology, the world will move toward a fully interconnected network society where anyone or anything can acquire information and share data anytime and anywhere. It is estimated that there will be 50 billion interconnected devices by 2020, of which only about 10 billion may be mobile phones and tablet computers. The rest are not machines communicating with human beings but machines communicating with one another. Therefore, how to design a system to better support the Internet of Everything is a subject needing further and intensive study.

In order to better implement the Internet of Everything, a new work item (see non-patent literature: RP-151621 New Work Item: NarrowBand. IOT (NB-IoT)), which may be referred to as narrowband Internet of Things (NB-IoT), was proposed in the 3rd Generation Partnership Project (3GPP) Long Term Evolution (LTE) standard at the 3GPP RAN #69 plenary session held in September 2015. In the description of the item, in order to meet the requirements for low power consumption, long standby time, lowered costs, and wide coverage of Internet of Things terminals, NB-IoT is set to operate in narrowband systems of uplink/downlink 180 KHz. The first-stage NB-IoT systems have completed the basic functional design, including system information broadcast notification, point-to-point unicast uplink data transmission and downlink data reception, and so on. In view of multicast demands for software download, terminal system upgrade, and packet information transfer in the future Internet of Things, a new work item aiming to enhance NB-IoT and implement multicast (see non-patent literature: RP-161324 New work item proposal: Enhancements of NB-IoT) was determined at the 3GPP RAN #72 plenary session held in June 2016, which explicitly pointed out that multicast transmission in an NB-IoT system is implemented based on the existing LTE Rel-13 SC-PTM characteristics.

In an existing LTE system, SC-PTM (single-Cell Point-To-Multipoint) refers to multicast transmission of a multimedia broadcast service broadcasted in a single cell. This characteristic introduces two logical channels: an SC-MCCH (Single-Cell Multicast Control Channel) and an SC-MTCH (Single-Cell Multicast Traffic Channel), which are multiplexed on a transport layer channel: DL-SCH (Downlink Share Channel). The SC-MCCH is a control channel and carries information including the type of a multicast service broadcasted in a current cell and scheduling and reception configurations of a traffic channel SC-MTCH on which the service broadcasts. The SC-MTCH is a traffic channel and carries specific service content.

In an NB-IoT system, transmission of an SC-MCCH channel is scheduled and instructed by DCI on an NPDCCH. The content of the DCI includes time-frequency resources, encoding information, and so on of SC-MCCH transmission. A terminal can receive the SC-MCCH channel according to the instruction of the content of the DCI so as to acquire information transmitted on the SC-MCCH. Thus, receiving of an SC-MCCH includes two parts: first, receiving an NPDCCH scheduling the transmission of SC-MCCH; and second, receiving information transmitted on the SC-MCCH according to the information included in the DCI which is carried on the NPDCCH.

The information transmitted on the SC-MCCH includes configuration information of an SC-MTCH where various MBMS services are broadcasted. The configuration information is used for receiving SC-MTCH channel and consequently for receiving information broadcasted on the SC-MTCH channel. In an NB-IoT system, transmission of an SC-MTCH channel is scheduled and instructed by DCI on an NPDCCH. Time-frequency resources at which the NPDCCH appears are provided by information on an SC-MCCH channel. A terminal first monitors, on corresponding time-frequency resources, whether an NPDCCH scheduling an SC-MTCH exists, which specifically includes first receiving a corresponding NPDCCH common search space, and then searching whether an NPDCCH scrambled by an RNTI corresponding to the SC-MTCH exists, and if yes, decoding the NPDCCH and extracting DCI information carried on the NPDCCH. The content of the DCI includes time-frequency resources, encoding information, and so on of SC-MTCH transmission. The terminal can receive the SC-MTCH channel according to the instruction of the content of the DCI so as to acquire information transmitted on the SC-MTCH. Thus, receiving of an SC-MTCH includes two parts: first, receiving an NPDCCH scheduling the transmission of SC-MTCH; and second, receiving information transmitted on the SC-MTCH according to the information included in the DCI which is carried on the NPDCCH.

A terminal interested in a multicast service first acquires, through broadcast content on a system information block SIB20, scheduling and configuration of an SC-MCCH channel, which specifically configures an assigned moment of an NPDCCH that schedules the SC-MCCH. The terminal then monitors and detects the NPDCCH at the corresponding moment.

SC-MCCH information may be changed during transmission of an MBMS service possibly because a new service is added, or an old service ends, or an SC-MTCH configuration of a certain service changes. When the SC-MCCH information changes or is about to change, a network side transmits an SC-MCCH information change notification. The SC-MCCH information change notification is carried on a NPDCCH and appears only at an appointed moment. For example, in an LTE system, a PDCCH carrying a change notification always appears in the same subframe as that of a PDCCH scheduling an SC-MCCH; in an NB-IoT system, an SC-MCCH information change notification may appear at a different moment from that of an NPDCCH scheduling an SC-MCCH, or may be included on the NPDCCH scheduling the transmission of SC-MCCH, or may be included on a paging channel. Thus, a terminal receiving the MBMS service only needs to monitor, at the corresponding moment, whether an NPDCCH or a paging message carrying an SC-MCCH information change notification exists.

In an NB-IoT system, in order to save costs, terminal reception is designed based on narrowbands, and downlink reception bandwidth is only 180 kHz, namely, the bandwidth of one carrier. However, in an enhanced NB-IoT system, an SC-MCCH and an SC-MTCH may be configured on different carriers. How a terminal receives an SC-MTCH channel and how to obtain an SC-MCCH channel change notification are problems that need to be solved.

SUMMARY OF INVENTION

In order to solve the technical problems of how to receive an SC-MTCH channel and how to obtain an SC-MCCH channel change notification in the current NB-IoT system, the present disclosure provides the following technical solutions.

According to one aspect of the present disclosure, a method performed at user equipment (UE) is provided, comprising: receiving single-cell multicast control channel (SC-MCCH)-related information; receiving single-cell multicast traffic channel (SC-MTCH)-related information according to the received SC-MCCH-related information; monitoring an SC-MCCH information change notification used for indicating whether SC-MCCH transmission information changes; and when the monitoring of the SC-MCCH information change notification conflicts with the receiving of the SC-MTCH-related information, monitoring the SC-MCCH information change notification.

In one exemplary embodiment, the step of receiving SC-MCCH-related information comprises: monitoring and receiving a first narrowband physical downlink control channel (NPDCCH), the first NPDCCH carrying downlink control information (DCI) used for indicating SC-MCCH scheduling information; and receiving the SC-MCCH transmission information according to the SC-MCCH scheduling information.

In one exemplary embodiment, the step of receiving SC-MTCH-related information according to the received SC-MCCH-related information comprises: monitoring and receiving a second NPDCCH according to the SC-MCCH transmission information, the second NPDCCH carrying DCI used for indicating SC-MTCH scheduling information; and receiving SC-MTCH transmission information according to the SC-MTCH scheduling information.

In one exemplary embodiment, the SC-MCCH information change notification is instructed by the DCI carried on the first NPDCCH; and the monitoring of the SC-MCCH information change notification conflicting with the receiving of the SC-MTCH-related information comprises either one of the following situations: a subframe or moment assigned for monitoring the first NPDCCH conflicts with a subframe or moment assigned for monitoring the second NPDCCH; and a subframe or moment assigned for monitoring the first NPDCCH conflicts with a subframe or moment assigned for receiving the SC-MTCH transmission information.

In one exemplary embodiment, the SC-MCCH information change notification is instructed by DCI carried on a third NPDCCH; and the monitoring of the SC-MCCH information change notification conflicting with the receiving of the SC-MTCH-related information comprises either one of the following situations: a subframe or moment assigned for monitoring the third NPDCCH conflicts with a subframe or moment assigned for monitoring the second NPDCCH; and a subframe or moment assigned for monitoring the third NPDCCH conflicts with a subframe or moment assigned for receiving the SC-MTCH transmission information.

In one exemplary embodiment, the method further comprises: after monitoring and receiving the SC-MCCH information change notification when the monitoring of the SC-MCCH information change notification conflicts with the receiving of the SC-MTCH-related information is completed, receiving the SC-MTCH-related information according to the changed SC-MCCH transmission information.

According to another aspect of the present disclosure, user equipment (UE) is provided, comprising: a transceiver, configured to receive single-cell multicast control channel (SC-MCCH)-related information; receive single-cell multicast traffic channel (SC-MTCH)-related information according to the received SC-MCCH-related information; and monitor an SC-MCCH information change notification used for indicating whether SC-MCCH transmission information changes; and a detection unit, configured to detect whether the monitoring of the SC-MCCH information change notification conflicts with the receiving of the SC-MTCH-related information, wherein the transceiver is further configured to monitor the SC-MCCH information change notification when the detection unit detects that the monitoring of the SC-MCCH information change notification conflicts with the receiving of the SC-MTCH-related information.

In one exemplary embodiment, the transceiver is further configured to: monitor and receive a first narrowband physical downlink control channel (NPDCCH), the first NPDCCH carrying downlink control information (DCI) used for indicating SC-MCCH scheduling information; and receive the SC-MCCH transmission information according to the SC-MCCH scheduling information.

In one exemplary embodiment, the transceiver is further configured to: monitor and receive a second NPDCCH according to the SC-MCCH transmission information, the second NPDCCH carrying DCI used for indicating SC-MTCH scheduling information; and receive SC-MTCH transmission information according to the SC-MTCH scheduling information.

In one exemplary embodiment, the SC-MCCH information change notification is instructed by the DCI carried on the first NPDCCH; and the monitoring of the SC-MCCH information change notification conflicting with the receiving of the SC-MTCH-related information comprises either one of the following situations: a subframe or moment assigned for monitoring the first NPDCCH conflicts with a subframe or moment assigned for monitoring the second NPDCCH; and a subframe or moment assigned for monitoring the first NPDCCH conflicts with a subframe or moment assigned for receiving the SC-MTCH transmission information.

In one exemplary embodiment, the SC-MCCH information change notification is instructed by DCI carried on a third NPDCCH; and the monitoring of the SC-MCCH information change notification conflicting with the receiving of the SC-MTCH-related information comprises either one of the following situations: a subframe or moment assigned for monitoring the third NPDCCH conflicts with a subframe or moment assigned for monitoring the second NPDCCH; and a subframe or moment assigned for monitoring the third NPDCCH conflicts with a subframe or moment assigned for receiving the SC-MTCH transmission information.

In one exemplary embodiment, the receiver is further configured to, after monitoring and receiving the SC-MCCH information change notification when the monitoring of the SC-MCCH information change notification conflicts with the receiving of the SC-MTCH-related information is completed, receive the SC-MTCH-related information according to the changed SC-MCCH transmission information.

According to another aspect of the present disclosure, a method performed at a base station is provided, comprising:

transmitting single-cell multicast control channel (SC-MCCH)-related information; transmitting single-cell multicast traffic channel (SC-MTCH)-related information, the SC-MTCH-related information being scheduled according to the SC-MCCH-related information; determining whether transmitting of an SC-MCCH information change notification used for indicating whether SC-MCCH transmission information changes conflicts with the transmitting of the SC-MTCH-related information; and when determining that the transmitting of the SC-MCCH information change notification conflicts with the transmitting of the SC-MTCH-related information, retransmitting, after the conflict ends, the SC-MTCH-related information sent at a moment of conflict.

In one exemplary embodiment, the step of transmitting SC-MCCH-related information comprises: transmitting a first narrowband physical downlink control channel (NPDCCH), the first NPDCCH carrying downlink control information (DCI) used for indicating SC-MCCH scheduling information; and transmitting the SC-MCCH transmission information, the SC-MCCH transmission information being scheduled according to the SC-MCCH scheduling information.

In one exemplary embodiment, the step of transmitting SC-MTCH-related information comprises: transmitting a second NPDCCH, the second NPDCCH carrying DCI used for indicating SC-MTCH scheduling information; and transmitting SC-MTCH transmission information, the SC-MTCH transmission information being scheduled according to the SC-MCCH scheduling information.

In one exemplary embodiment, the SC-MCCH information change notification is instructed by the DCI carried on the first NPDCCH; and the transmitting of the SC-MCCH information change notification conflicting with the transmitting of the SC-MTCH-related information comprises either one of the following situations: a subframe or moment of transmitting the first NPDCCH conflicts with a subframe or moment of transmitting the second NPDCCH; and a subframe or moment of transmitting the first NPDCCH conflicts with a subframe or moment of transmitting the SC-MTCH transmission information.

In one exemplary embodiment, the SC-MCCH information change notification is instructed by DCI carried on a third NPDCCH; and the transmitting of the SC-MCCH information change notification conflicting with the transmitting of the SC-MTCH-related information comprises either one of the following situations: a subframe or moment of transmitting the third NPDCCH conflicts with a subframe or moment of transmitting the second NPDCCH; and a subframe or moment of transmitting the third NPDCCH conflicts with a subframe or moment of transmitting the SC-MTCH transmission information.

In one exemplary embodiment, the retransmitting, after the conflict ends, the SC-MTCH-related information sent at a moment of conflict comprises one of the following: transmitting the second NPDCCH, the DCI carried on the second NPDCCH indicating the SC-MTCH scheduling information scheduling transmitting of the SC-MTCH transmission information that is sent at the moment of conflict; and fully or partially retransmitting the SC-MTCH transmission information sent at the moment of conflict.

According to another aspect of the present disclosure, a base station is provided, comprising: a transceiver, configured to transmit single-cell multicast control channel (SC-MCCH)-related information; and transmit single-cell multicast traffic channel (SC-MTCH)-related information, the SC-MTCH-related information being scheduled according to the SC-MCCH-related information; and a determining unit, configured to determine whether transmitting of an SC-MCCH information change notification used for indicating whether SC-MCCH transmission information changes conflicts with the transmitting of the SC-MTCH-related information, wherein the transceiver is further configured to, when the determining unit determines that the transmitting of the SC-MCCH information change notification conflicts with the transmitting of the SC-MTCH-related information, retransmit, after the conflict ends, the SC-MTCH-related information sent at a moment of conflict.

In one exemplary embodiment, the transceiver is further configured to: transmit a first narrowband physical downlink control channel (NPDCCH), the first NPDCCH carrying downlink control information (DCI) used for indicating SC-MCCH scheduling information; and transmit the SC-MCCH transmission information, the SC-MCCH transmission information being scheduled according to the SC-MCCH scheduling information.

In one exemplary embodiment, the transceiver is further configured to: transmit a second NPDCCH, the second NPDCCH carrying DCI used for indicating SC-MTCH scheduling information; and transmit SC-MTCH transmission information, the SC-MTCH transmission information being scheduled according to the SC-MTCH scheduling information.

In one exemplary embodiment, the SC-MCCH information change notification is instructed by the DCI carried on the first NPDCCH; and the transmitting of the SC-MCCH information change notification conflicting with the transmitting of the SC-MTCH-related information comprises either one of the following situations: a subframe or moment of transmitting the first NPDCCH conflicts with a subframe or moment of transmitting the second NPDCCH; and a subframe or moment of transmitting the first NPDCCH conflicts with a subframe or moment of transmitting the SC-MTCH transmission information.

In one exemplary embodiment, the SC-MCCH information change notification is instructed by DCI carried on a third NPDCCH; and the transmitting of the SC-MCCH information change notification conflicting with the transmitting of the SC-MTCH-related information comprises either one of the following situations: a subframe or moment of transmitting the third NPDCCH conflicts with a subframe or moment of transmitting the second NPDCCH; and a subframe or moment of transmitting the third NPDCCH conflicts with a subframe or moment of transmitting the SC-MTCH transmission information.

In one exemplary embodiment, the transceiver is further configured to: transmit the second NPDCCH, the DCI carried on the second NPDCCH indicating the SC-MTCH scheduling information scheduling transmitting of the SC-MTCH transmission information that is sent at the moment of conflict; or fully or partially retransmit the SC-MTCH transmission information sent at the moment of conflict.

Thus, the embodiments of the present disclosure provide a solution to a conflict of monitoring of an SC-MCCH channel change notification with receiving of an SC-MTCH channel. Based on this solution, when a conflict occurs, a terminal can acquire an information change notification and a changed SC-MCCH in time; further, after the conflict ends, the terminal again receives SC-MTCH transmission information transferred during the conflict, so as to avoid information missing.

BRIEF DESCRIPTION OF DRAWINGS

The above and other features of the present disclosure will become more apparent with the following detailed description in conjunction with the accompanying drawings.

DETAILED DESCRIPTION OF EMBODIMENTS

The following describes the present disclosure in detail with reference to the accompanying drawings and specific embodiments. It should be noted that the present disclosure should not be limited to the specific embodiments described below. In addition, for simplicity, detailed description of the known art not directly related to the present disclosure is omitted to prevent confusion in understanding the present disclosure.

In the following description, an LTE mobile communications system and its later evolved versions are used as exemplary application environments, and a base station and UE (user equipment) that support NB-IoT are used as examples to set forth multiple embodiments of the present disclosure in detail. However, it should be noted that the present disclosure is not limited to the following embodiments, but is applicable to more other wireless communications systems, such as a future 5G cellular communications system, and is applicable to other base stations and UE, such as base stations and UE supporting eMTC (enhanced Machine-Type Communication), MMTC (Massive Machine-Type Communication), and so on.

Prior to the detailed description, several terms mentioned in the present disclosure are illustrated as follows, where some terms have been mentioned in the Background section. The terms involved in the present disclosure shall have the meanings set forth below, unless otherwise indicated.

SC-PTM (Single-Cell Point-To-Multipoint): point-to-multipoint

SC-MCCH (Single-Cell Multicast Control Channel): multicast control channel

SC-MTCH (Single-Cell Multicast Traffic Channel): single-cell multicast traffic channel NPDCCH (Narrowband Physical Downlink Control Channel): narrowband physical downlink control channel DCI (Downlink Control Information): downlink control information MBMS Session Identity (Multimedia Broadcast Multicast Service Session Identity): multimedia broadcast multicast service session identity In addition, the terms "UE," "terminal," and "terminal device" are used interchangeably herein.

Figure 1:
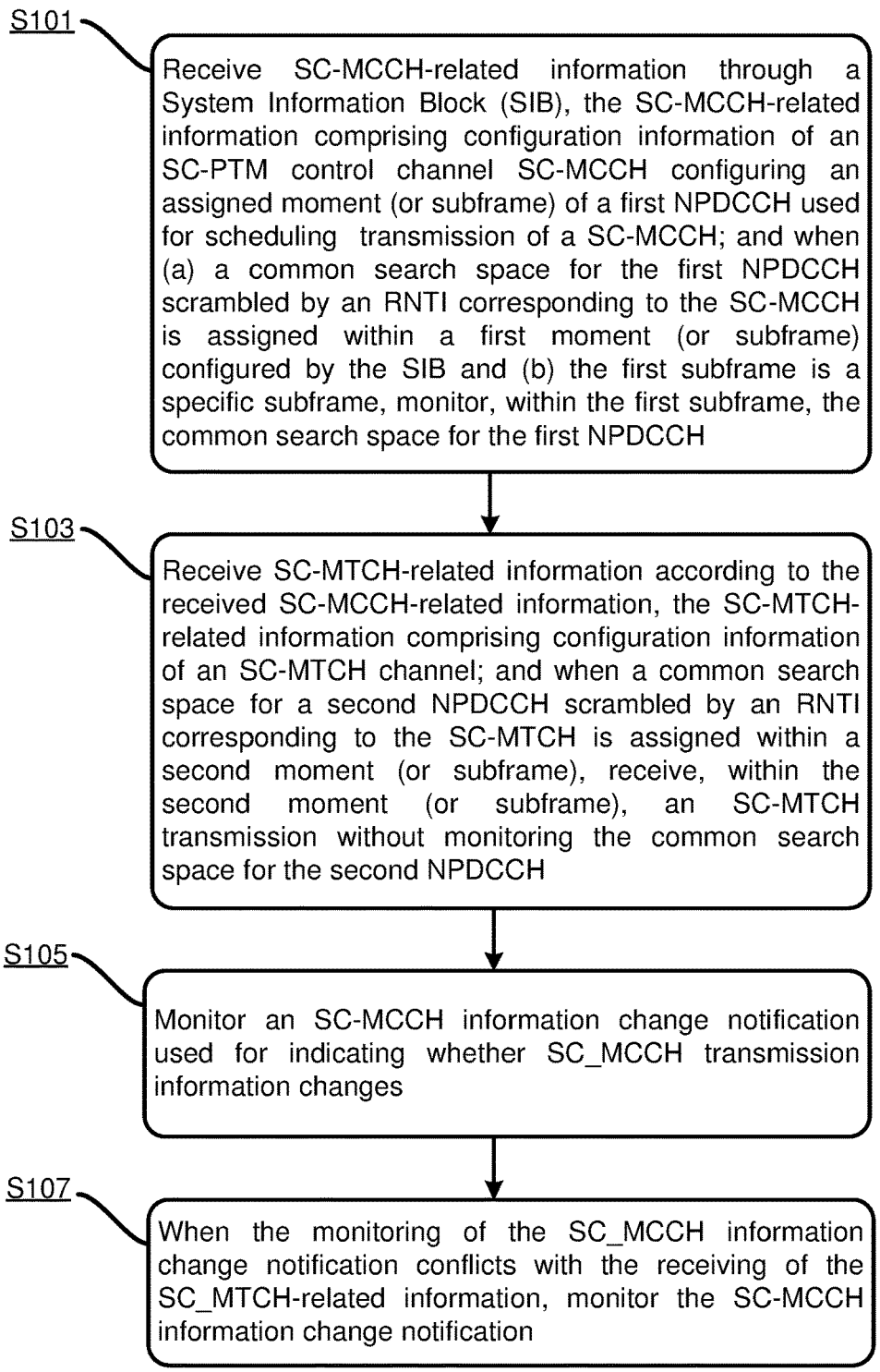
FIG. 1 is a flowchart of a method performed at UE according to an exemplary embodiment of the present disclosure.

A method performed at UE for receiving a single-cell multicast service according to an exemplary embodiment of the present disclosure will be described below with reference to FIG. 1. FIG. 1 schematically shows a flowchart of a method 100 performed at UE according to an exemplary embodiment of the present disclosure.

As shown in FIG. 1, in step S101, the UE receives SC-MCCH-related information.

Specifically, UE interested in a multicast service first acquires, through content broadcast on a system information block SIB20 or notified to the UE through dedicated signaling, configuration information of an SC-PTM control channel SC-MCCH, which specifically configures an assigned moment of an NPDCCH (referred to as a first NPDCCH herein) used for scheduling the transmission of SC-MCCH. In an NB-IoT system, transmission of an SC-MCCH channel is instructed by DCI on a first NPDCCH. Those skilled in the art can understand that time-frequency resources at which the first NPDCCH may appear may also be predefined by a network side.

Then, the UE can monitor the first NPDCCH at the corresponding moment, which specifically includes first receiving an NPDCCH common search space, and then searching whether a first NPDCCH scrambled by an RNTI corresponding to the SC-MCCH exists, and if yes, decoding the first NPDCCH and extracting DCI carried on the first NPDCCH to obtain SC-MCCH scheduling information instructed by the DCI. The DCI carried on the first NPDCCH channel instructs the SC-MCCH scheduling information, which includes time-frequency resources and encoding information assigned for SC-MCCH transmission, and optionally, the number of times the SC-MCCH transmission is repeated, and so on. The UE can receive the SC-MCCH channel according to the SC-MCCH scheduling information instructed by the DCI, so as to acquire information transmitted on the SC-MCCH channel, which is also referred to as SC-MCCH transmission information. Therefore, receiving of an SC-MCCH includes two parts: first, monitoring and receiving a first NPDCCH, the first NPDCCH carrying DCI used for instructing SC-MCCH scheduling information; and second, receiving, according to the SC-MCCH scheduling information, information transmitted on the SC-MCCH, namely, SC-MCCH transmission information.

Step S103: The UE receives SC-MTCH-related information according to the received SC-MCCH-related information.

The SC-MCCH transmission information includes configuration information of an SC-MTCH channel where various MBMS services are broadcasted. The configuration information is used for receiving SC-MTCH channel transmission information (receiving the SC-MTCH channel or receiving the SC-MTCH for short). In an NB-IoT system, transmission of an SC-MTCH channel is scheduled and instructed by DCI on another NPDCCH (referred to as a second NPDCCH herein). Time-frequency resources at which the second NPDCCH may be assigned are provided by information transmitted on an SC-MCCH channel (namely, SC-MCCH transmission information). The UE first monitors, on the corresponding assigned time-frequency resources, whether a second NPDCCH scheduling the transmission of SC-MTCH exists, which specifically includes first receiving an NPDCCH common search space, and then searching whether an NPDCCH scrambled by an RNTI corresponding to the SC-MTCH exists, and if yes, decoding the NPDCCH and extracting DCI information carried on the second NPDCCH to obtain SC-MTCH scheduling information, which includes time-frequency resources and encoding information assigned for SC-MTCH transmission, and optionally, the number of times the SC-MTCH transmission is repeated, and so on. The UE can receive the SC-MTCH channel according to the SC-MTCH scheduling information instructed by the DCI, so as to acquire information transmitted on the SC-MTCH channel, which is also referred to as SC-MTCH transmission information. Therefore, receiving of an SC-MTCH includes two parts: first, monitoring and receiving a second NPDCCH, the second NPDCCH carrying DCI used for instructing SC-MTCH scheduling information; and second, receiving, according to the SC- MTCH scheduling information, information transmitted on the SC-MTCH, namely, SC-MTCH transmission information.

The SC-MCCH transmission information may be changed during transmission of an MBMS service possibly because a new service is added, or an old service ends, or an SC-MTCH configuration of a certain service changes. Therefore, when the SC-MCCH information changes or is about to change, the network side transmits to the UP an SC-MCCH information change notification used for indicating whether the SC-MCCH transmission information changes. The SC-MCCH information change notification is carried on an NPDCCH and appears only at a predetermined moment. In an NB-IoT system, the SC-MCCH information change notification may appear at a different moment from that of the NPDCCH scheduling the transmission of SC-MCCH, or may be included on the NPDCCH scheduling the transmission of SC-MCCH, or may be included on a paging channel. Thus, the UE receiving the MBMS service only needs to monitor, at the corresponding moment, whether an NPDCCH or paging message carrying the SC-MCCH information change notification exists.

Therefore, the method 100 may further include step S105, in which the UE monitors an SC-MCCH information change notification.

Time-frequency resources at which the SC-MCCH information change notification may appear may be predefined by a network side or notified to the UE in the configuration information of the SC-MCCH. The UE is required to monitor and receive the SC-MCCH information change notification at the corresponding moment, so as to indicate whether the SC-MCCH transmission information changes.

Since a carrier for transmitting the SC-MTCH is different from a carrier for transmitting the SC-MCCH and a carrier for indicating the SC-MCCH change notification, when the terminal continuously receives the SC-MTCH, the monitoring and receiving of the SC-MCCH information change notification may conflict with the receiving of the SC-MTCH-related information.

Thus, the UP needs to detect whether the monitoring of the SC-MCCH information change notification conflicts with the receiving of the SC-MTCH-related information. Step S107: The UE chooses to monitor the SC-MCCH information change notification when the monitoring of the SC-MCCH information change notification conflicts with the receiving of the SC-MTCH-related information.

After completing monitoring and receiving the SC-MCCH information change notification when the monitoring of the SC-MTCH information change notification conflicts with the receiving of the SC-MTCH-related information, the UE can receive the SC-MTCH related information according to the changed SC-MCCH transmission information.

In one embodiment, the SC-MCCH information change notification may be indicated by DCI carried on another NPDCCH (referred to as a third NPDCCH herein). A moment or resource at which the third NPDCCH may appear may be predefined by the network side or notified to the UE in the configuration information of the SC-MCCH. The UE is required to monitor the third NPDCCH at the corresponding moment, so as to determine whether the SC-MCCH information changes.

When a subframe or moment assigned for monitoring the third NPDCCH (namely, a subframe or moment assigned for monitoring the SC-MCCH information change notification) conflicts with a subframe or moment assigned for receiving the SC-MTCH-related information, at the conflicting subframe or moment, the UE can choose to monitor the third NPDCCH, that is, give up receiving the SC-MTCH-related information and monitor and receive the third NPDCCH.

As described earlier, the receiving of the SC-MTCH-related information includes two parts: the monitoring and receiving of the second NPDCCH and the receiving of the SC-MTCH transmission information. Thus, the subframe or moment assigned for monitoring the third NPDCCH conflicting with the subframe or moment assigned for receiving the SC-MTCH-related information may include either one of the following situations: the subframe or moment assigned for monitoring the third NPDCCH conflicts with a subframe or moment assigned for monitoring the second NPDCCH; and the subframe or moment assigned for monitoring the third NPDCCH conflicts with a subframe or moment assigned for receiving the SC-MTCH transmission information.

If the SC-MCCH information change notification obtained after the UE completes monitoring and receiving the third NPDCCH indicates that the SC-MCCH transmission information does not change, the UE can continue to receive the SC-MTCH-related information. Specifically, in the situation that the subframe or moment assigned for monitoring the third NPDCCH conflicts with the subframe or moment assigned for receiving the second NPDCCH, the UE can continue to receive the second NPDCCH and receive the SC-MTCH transmission information; in the situation that the subframe or moment assigned for monitoring the third NPDCCH conflicts with the subframe or moment assigned for receiving the SC-MTCH transmission information, the UE can continue to receive the SC-MTCH transmission information.

If the SC-MCCH information change notification obtained after the UE completes monitoring and receiving the third NPDCCH indicates that the SC-MCCH transmission information changes, the UE needs to further acquire the changed SC-MCCH transmission information.

Thus, the UE receives the changed SC-MCCH transmission information according to the SC-MCCH scheduling information indicated by the DCI carried on the first NPDCCH. Then, the UE monitors and receives the second NPDCCH according to the received changed SC-MCCH transmission information, and receives the SC-MTCH transmission information according to the SC-MTCH scheduling information instructed by the DCI carried on the second NPDCCH.

It should be understood that once the UE learns that the SC-MCCH information changes according to indication of the received SC-MCCH information change notification, the terminal needs to further receive SC-MCCH information. Since the carrier for transmitting the SC-MTCH is different from the carrier for transmitting the SC-MCCH, when the terminal continuously receives the SC-MTCH, the receiving of the SC-MCCH-related information may conflict with the receiving of the SC-MTCH-related information When a subframe or moment assigned for receiving the SC-MCCH-related information conflicts with the subframe or moment assigned for receiving the SC-MTCH-related information, at the conflicting subframe or moment, the UE chooses to receive the SC-MCCH-related information, that is, give up receiving the SC-MTCH-related information and continue to receive the SC-MCCH-related information. As described earlier, the receiving of the SC-MCCH-related information includes two parts: the monitoring and receiving of the first NPDCCH and the receiving of the SC-MCCH transmission information; and the receiving of the SC-MTCH-related information also includes two parts: the monitoring and receiving of the second NPDCCH and the receiving of the SC-MTCH transmission information. Thus, the subframe or moment assigned for receiving the SC-MCCH-related information conflicting with the subframe or moment assigned for receiving the SC-MTCH-related information may be any one of the following four situations:

a subframe or moment assigned for monitoring the first NPDCCH conflicts with a subframe or moment assigned for monitoring the second NPDCCH;

a subframe or moment assigned for monitoring the first NPDCCH conflicts with a subframe or moment assigned for receiving the SC-MTCH transmission information;

a subframe or moment assigned for receiving the SC-MCCH channel conflicts with a subframe or moment assigned for monitoring the second NPDCCH; and a subframe or moment assigned for receiving the SC-MCCH channel conflicts with a subframe or moment assigned for receiving the SC-MTCH transmission information.

After completing receiving the SC-MCCH-related information, the UE can continue to receive the SC-MTCH-related information. Specifically, in the situation that the subframe or moment assigned for monitoring the first NPDCCH conflicts with the subframe or moment assigned for monitoring the second NPDCCH, or the subframe or moment assigned for receiving the SC-MCCH transmission information conflicts with the subframe or moment assigned for monitoring the second NPDCCH, after completing receiving the SC-MCCH transmission information, the UE can continue to monitor and receive the second NPDCCH and receive the SC-MTCH transmission information; in the situation that the subframe or moment assigned for monitoring the first NPDCCH conflicts with the subframe or moment assigned for receiving the SC-MTCH transmission information, or the subframe or moment assigned for receiving the SC-MCCH transmission information conflicts with the subframe or moment assigned for receiving the SC-MTCH transmission information, after completing receiving the SC-MCCH, the UE can continue to receive the SC-MTCH channel.

In another embodiment, the SC-MCCH information change notification may be instructed in the DCI carried on the first NPDCCH which is used for instructing SC-MCCH scheduling information. A moment or resource at which the first NPDCCH may assigned may be predefined by the network side or notified to the UE in the configuration information of the SC-MCCH. The UE is required to monitor the first NPDCCH at the corresponding moment, so as to obtain the SC-MCCH scheduling information and the SC-MCCH information change notification.

When a subframe or moment assigned for monitoring the first NPDCCH conflicts with a subframe or moment assigned for receiving the SC-MTCH-related information, at the conflicting subframe or moment, the UE chooses to receive the first NPDCCH, that is, give up receiving the SC-MTCH-related information and continue to monitor and receive the first NPDCCH.

The monitoring of the SC-MCCH information change notification conflicting with the receiving of the SC-MTCH-related information may include either one of the following situations:

a subframe or moment assigned for monitoring the first NPDCCH conflicts with a subframe or moment assigned for monitoring the second NPDCCH; and a subframe or moment assigned for monitoring the first NPDCCH conflicts with a subframe or moment assigned for receiving the SC-MTCH transmission information.

If the SC-MCCH information change notification indicated by the DCI carried on the first NPDCCH that is obtained after the LIE completes monitoring and receiving the first NPDCCH indicates that the SC-MCCH transmission information does not change, the UE can continue to receive the SC-MTCH-related information. Specifically, in the situation that the subframe or moment assigned for monitoring the first NPDCCH conflicts with the subframe or moment assigned for monitoring the second NPDCCH, the UE can continue to monitor and receive the second NPDCCH and receive the SC-MTCH transmission information; in the situation that the subframe or moment assigned for monitoring the first NPDCCH conflicts with the subframe or moment assigned for monitoring the SC-MTCH transmission information, the UE can continue to receive the SC-MTCH transmission information.

If the SC-MCCH information change notification indicated by the DCI carried on the first NPDCCH that is obtained after the UE completes monitoring and receiving the first NPDCCH indicates that the SC-MCCH transmission information changes, the UE continues to receive the changed SC-MCCH transmission information according to the SC-MCCH scheduling information indicated by the DCI carried on the received first NPDCCH. Then, the UE monitors and receives the second NPDCCH according to the received changed SC-MCCH transmission information, and receives the SC-MTCH transmission information according to the SC-MTCH scheduling information indicated by the DCI carried on the second NPDCCH.

Several operational examples according to the present invention are described in detail below.

Example 1

A terminal monitors an NPDCCH used for scheduling an SC-MTCH. When the terminal is configured to monitor, on another carrier, starting from a subframe moment n, an NPDCCH used for an SC-MCCH information change notification, the terminal does not monitor, starting from the subframe moment n, an NPDCCH used for scheduling an SC-MTCH, but instead monitors, according to the configuration, an NPDCCH used for an SC-MCCH information change notification. Optionally, the terminal may monitor, on another carrier, starting from a subframe moment n-k, the NPDCCH used for an SC-MCCH information change notification, where k is a switching time required for the terminal to switch from reception on one carrier to reception on another carrier.

Optionally, the terminal may stop a running SC-PTM discontinuous reception timer.

Example 2

A terminal receives an NPDCCH channel carrying SC-MTCH information, where transmission of the channel occupies N consecutive subframes, and these subframes do not include subframes assigned for transmitting an SC-MCCH information change notification on another carrier. The terminal monitors, in these subframes and according to a configuration, for example, a configuration in SC-MCCH transmission information or a configuration predefined by a network side, an NPDCCH used for an SC-MCCH information change notification.

Optionally, the terminal may maintain a running SC-PTM discontinuous reception timer, and if information in x subframes in the N subframes is not received when the timer times out, the terminal abandons content in the received (N-x) subframes.

It should be understood that although the steps included in the method 100 are marked with sequence numbers, these sequence numbers do not limit the order in which these steps are performed. The steps in the method 100 can be performed in any order in an implementable manner.

A schematic structure of UE according to an exemplary embodiment of the present invention will be described below with reference to FIG. 2.

Figure 2:
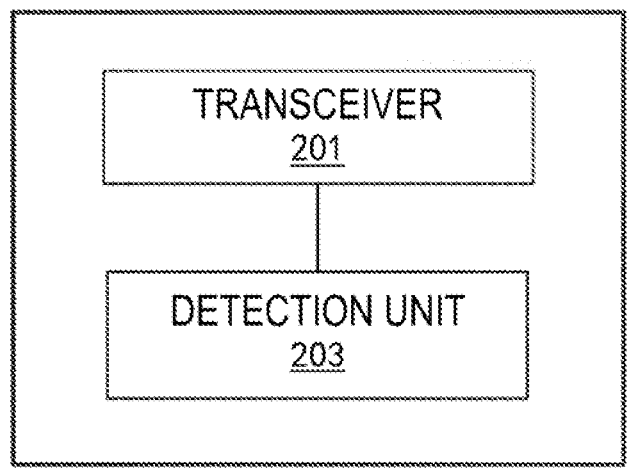
FIG. 2 is a schematic structural diagram of UE according to an exemplary embodiment of the present disclosure.

FIG. 2 is a schematic structural diagram of UE 200 according to an exemplary embodiment of the present invention. As shown in FIG. 2, the UE 200 includes a transceiver 201 and a detection unit 203. Those skilled in the art should understand that only the transceiver 201 and the detection unit 203 related to the present invention are shown in the UE 200 of FIG. 2 to avoid confusion of the present invention. However, those skilled in the art should understand that although not shown in FIG. 2, the UE according to the embodiment of the present invention further includes other units that constitute the UE. The UE 200 can be used for performing a method for receiving a single-cell multicast service according to various embodiments of the present invention, for example, the method 100 shown in FIG. 1.

The UE 200 can use the transceiver 201 to receive SC-MCCH-related information in step S101; receive SC-MTCH-related information according to the received SC-MCCH-related information in step S103; and monitor an SC-MCCH information change notification used for indicating whether SC-MCCH transmission information changes in step S105.

Specifically, in step S101, the transceiver 201 monitors and receives a first NPDCCH, the first NPDCCH carrying downlink control information (DCI) used for instructing SC-MCCH scheduling information; and receives the SC-MCCH transmission information according to the SC-MCCH scheduling information.

In step S103, the transceiver 201 monitors and receives a second NPDCCH according to the SC-MCCH transmission information, the second NPDCCH carrying DCI used for instructing SC-MTCH scheduling information; and receives SC-MTCH transmission information according to the SC-MTCH scheduling information.

The UE 200 can use the detection unit 203 to detect whether the monitoring of the SC-MCCH information change notification used for indicating whether the SC-MCCH transmission information changes conflicts with the receiving of the SC-MTCH-related information. The transceiver 201 chooses to monitor the SC-MCCH information change notification in step S107 when the detection unit 203 detects that the monitoring of the SC-MCCH information change notification conflicts with the receiving of the SC-MTCH-related information.

After monitoring and receiving the SC-MCCH information change notification when the monitoring of the SC-MCCH information change notification conflicts with the receiving of the SC-MTCH-related information is completed, the transceiver 201 receives the SC-MTCH-related information according to the changed SC-MCCH transmission information.

As described earlier, in one embodiment, the SC-MCCH information change notification may be indicated by DCI carried on a third NPDCCH. In this embodiment, the monitoring of the SC-MCCH information change notification conflicting with the receiving of the SC-MTCH-related information includes either one of the following situations: a subframe or moment assigned for monitoring the first NPDCCH conflicts with a subframe or moment assigned for monitoring the second NPDCCH; and a subframe or moment assigned for monitoring the first NPDCCH conflicts with a subframe or moment assigned for receiving the SC-MTCH transmission information.

In another embodiment, the SC-MCCH information change notification is indicated by the DCI carried on the first NPDCCH. In this embodiment, the monitoring of the SC-MCCH information change notification conflicting with the receiving of the SC-MTCH-related information includes either one of the following situations: a subframe or moment assigned for monitoring the first NPDCCH conflicts with a subframe or moment assigned for monitoring the second NPDCCH; and a subframe or moment assigned for monitoring the first NPDCCH conflicts with a subframe or moment assigned for receiving the SC-MTCH transmission information.

Figure 3:
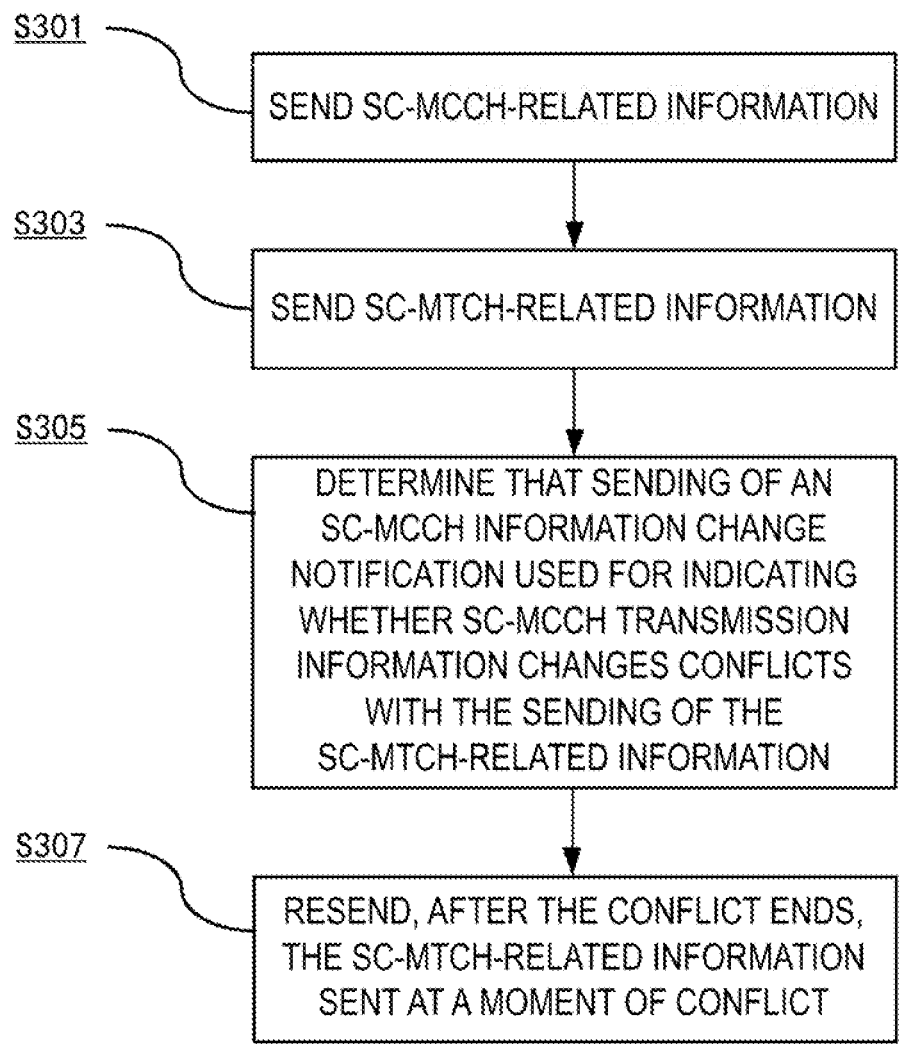
FIG. 3 is a flowchart of a method performed at a base station according to an exemplary embodiment of the present invention.

A method performed at a base station for transmitting a single-cell multicast service according to an exemplary embodiment of the present disclosure will be described below with reference to FIG. 3. FIG. 3 schematically shows a flowchart of a method 300 performed at a base station according to an exemplary embodiment of the present disclosure.

As shown in FIG. 3, in step S301, the base station transmits SC-MCCH-related information to UE. Specifically, the base station transmits a first NPDCCH, the first NPDCCH carrying downlink control information (DCI) used for instructing SC-MCCH scheduling information; and transmits SC-MCCH transmission information, the SC-MCCH transmission information being scheduled according to the SC-MCCH scheduling information.

In step S303, the base station transmits SC-MTCH-related information to the UE, the SC-MTCH-related information being scheduled according to the SC-MCCH-related information. Specifically, the base station transmits a second NPDCCH, the second NPDCCH carrying DCI used for instructing SC-MTCH scheduling information; and transmits SC-MTCH transmission information, the SC-MTCH transmission information being scheduled according to the SC-MTCH scheduling information.

In step S305, the base station determines whether transmission of an SC-MCCH information change notification used for indicating whether the SC-MCCH transmission information changes conflicts with the transmission of the SC-MTCH-related information.

In one embodiment, the SC-MCCH information change notification may be indicated by the DCI carried on the first NPDCCH. In this embodiment, the transmission of the SC-MCCH information change notification conflicting with the transmission of the SC-MTCH-related information includes either one of the following situations: a subframe or moment assigned for transmitting the first NPDCCH conflicts with a subframe or moment assigned for transmitting the second NPDCCH; and a subframe or moment assigned for transmitting the first NPDCCH conflicts with a subframe or moment assigned for transmitting the SC-MTCH transmission information.

In another embodiment, the SC-MCCH information change notification is indicated by DCI carried on a third NPDCCH. In this embodiment, the transmission of the SC-MCCH information change notification conflicting with the transmission of the SC-MTCH-related information includes either one of the following situations: a subframe or moment of transmitting the third NPDCCH conflicts with a subframe or moment assigned for transmitting the second NPDCCH; and a subframe or moment assigned for transmitting the third NPDCCH conflicts with a subframe or moment assigned for transmitting the SC-MTCH transmission information.

Upon determining that the transmission of the SC-MCCH information change notification conflicts with the transmission of the SC-MTCH-related information, in step S307, the base station retransmits, after the conflict ends, the SC-MTCH-related information transmitted at a moment of conflict, which specifically includes one of the following: transmitting the second NPDCCH, the DCI carried on the second NPDCCH indicating the SC-MTCH scheduling information scheduling transmitting of the SC-MTCH transmission information that is transmitted at the moment of conflict; and fully or partially retransmitting the SC-MTCH transmission information transmitted at the moment of conflict.

It should be understood that although the steps included in the method 300 are marked with sequence numbers, these sequence numbers do not limit the order in which these steps are performed. The steps in the method 300 can be performed in any order in an implementable manner.

A schematic structure of a base station according to an exemplary embodiment of the present invention will be described below with reference to FIG. 4.

Figure 4:
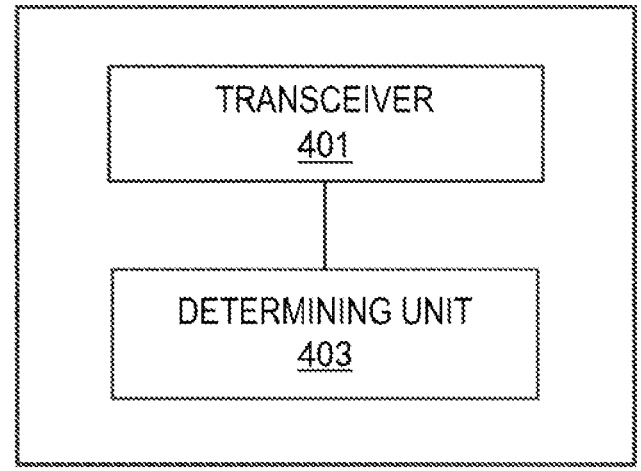
FIG. 4 is a schematic structural diagram of a base station according to an exemplary embodiment of the present invention.

FIG. 4 is a schematic structural diagram of a base station 400 according to an exemplary embodiment of the present invention. As shown in FIG. 4, the base station 400 comprises: a transceiver 401 and a determining unit 403. Those skilled in the art should understand that only the transceiver 401 and the determining unit 403 related to the present invention are shown in the base station 400 of FIG. 4 to avoid confusion of the present invention. However, those skilled in the art should understand that although not shown in FIG. 4, the base station according to the embodiment of the present invention further includes other units that make up the base station. The base station 400 can be used for performing a method for transmitting a single-cell multicast service according to various embodiments of the present invention, for example, the method 300 shown in FIG. 3.

The base station 400 can use the transceiver 401 to transmit SC-MCCH-related information in step S301; and transmit SC-MTCH-related information in step S303, the SC-MTCH-related information being scheduled according to the SC-MCCH-related information.

Specifically, in step S301, the transceiver 401 transmits a first NPDCCH, the first NPDCCH carrying downlink control information (DCI) used for instructing SC-MCCH scheduling information; and transmits SC-MCCH transmission information, the SC-MCCH transmission information being scheduled according to the SC-MCCH scheduling information.

In step S303, the transceiver 401 transmits a second NPDCCH, the second NPDCCH carrying DCI used for instructing SC-MTCH scheduling information; and transmits SC-MTCH transmission information, the SC-MTCH transmission information being scheduled according to the SC-MTCH scheduling information.

In one embodiment, an SC-MCCH information change notification may be indicated by the DCI carried on the first NPDCCH. In this embodiment, the transmission of the SC-MCCH information change notification conflicting with the transmission of the SC-MTCH-related information includes either one of the following situations: a subframe or moment assigned for transmitting the first NPDCCH conflicts with a subframe or moment assigned for transmitting the second NPDCCH; and a subframe or moment assigned for transmitting the first NPDCCH conflicts with a subframe or moment assigned for transmitting the SC-MTCH transmission information.

In another embodiment, the SC-MCCH information change notification is indicated by DCI carried on a third NPDCCH. In this embodiment, the transmission of the SC-MCCH information change notification conflicting with the transmission of the SC-MTCH-related information includes either one of the following situations: a subframe or moment assigned for transmitting the third NPDCCH conflicts with a subframe or moment assigned for transmitting the second NPDCCH; and a subframe or moment assigned for transmitting the third NPDCCH conflicts with a subframe or moment assigned for transmitting the SC-MTCH transmission information.

The base station 400 can use the determining unit 403 to determine whether the transmission of the SC-MCCH information change notification used for indicating whether the SC-MCCH transmission information changes conflicts with the transmission of the SC-MTCH-related information in step S305. When the determining unit 403 determines that the transmission of the SC-MCCH information change notification conflicts with the transmission of the SC-MTCH-related information, in step S307, the base station 400 uses the transceiver 401 to retransmit, after the conflict ends, the SC-MTCH-related information transmit at a moment of conflict, which specifically includes one of the following: transmitting the second NPDCCH, the DCI carried on the second NPDCCH indicating the SC-MTCH scheduling transmitting of the SC-MTCH transmission information that is transmitted at the moment of conflict; and fully or partially retransmitting the SC-MTCH transmission information transmitted at the moment of conflict.

The program running on the device according to the present invention may be a program that enables the computer to implement the functions of the embodiments of the present invention by controlling a central processing unit (CPU). The program or information processed by the program can be stored temporarily in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions can be achieved by the computer system through reading programs recorded on the recording medium and executing them. The so-called "computer system" herein may be a computer system embedded in the device, which may include operating systems or hardware (for example, peripherals). The "computer-readable recording medium" may be a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed through circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of the advances in semiconductor technology, one or more embodiments of the present invention may also be implemented using these new integrated circuit technologies.

Furthermore, the present invention is not limited to the embodiments described above. Although various examples of the described embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulted from the appropriate combinations of the technical means disclosed in different embodiments are also included within the technical scope of the present invention. In addition, components with the same effect described in the embodiments above may be replaced with one another.

The invention claimed is:

1. A method performed at user equipment (UE), comprising:
    in a case that (a) a common search space for a first narrowband physical downlink control channel (NPDCCH) scrambled by a Radio Network Temporary Identity (RNTI) corresponding to a Single-Cell Multicast Control Channel (SC-MCCH) is assigned within a first subframe which is configured by a system information block and (b) the first subframe is a specific subframe, monitoring, within the first subframe, the common search space for the first NPDCCH without performing specific processing; and
    in a case that a common search space for a second NPDCCH scrambled by an RNTI corresponding to a Single-Cell Multicast Traffic Channel (SC-MTCH) is assigned within a second subframe, receiving, within the second subframe, an SC-MCCH transmission without monitoring the common search space for the second NPDCCH, wherein
    the specific subframe is (a) a first specific subframe within which an SC-MTCH transmission is assigned or (b) a second specific subframe within which the common search space for the second NPDCCH is assigned, the specific processing not performed within the first specific subframe comprising receiving the SC-MTCH transmission, the specific processing not performed within the second specific subframe comprising monitoring the common search space for the second NPDCCH.

2. A user equipment (UE), comprising:
    a processor; and
    a memory, wherein
    the memory stores instructions that cause the processor to:
    in a case that (a) a common search space for a first narrowband physical downlink control channel (NPDCCH) scrambled by a Radio Network Temporary Identity (RNTI) corresponding to an Single-Cell Multicast Control Channel (SC-MCCH) is assigned within a first subframe which is configured by a system information block and (b) the first subframe is a specific subframe, monitor, within the first subframe, the common search space for the first NPDCCH without performing specific processing; and
    in a case that a common search space for a second NPDCCH scrambled by an RNTI corresponding to a Single-Cell Multicast Traffic Channel (SC-MTCH) is assigned within a second subframe, receive, within the second subframe, an SC-MCCH transmission without monitoring the common search space for the second NPDCCH, wherein
    the specific subframe is (a) a first specific subframe within which an SC-MTCH transmission is assigned or (b) a second specific subframe within which the common search space for the second NPDCCH is assigned, the specific processing not performed within the first specific subframe comprising receiving the SC-MTCH transmission, the specific processing not performed within the second specific subframe comprising monitoring the common search space for the second NPDCCH.

* * * * *